United States Patent [19]

Rabushka et al.

[11] Patent Number: 4,617,975
[45] Date of Patent: Oct. 21, 1986

[54] TENSION ACTUATED UNCOUPLER

[76] Inventors: Charles Rabushka, 436 Shadowridge Ct., St. Louis, Mo. 63011; Layton J. Reprogle, 4430 Eminence, Berkeley, Mo. 63134

[21] Appl. No.: 778,604

[22] Filed: Sep. 20, 1985

Related U.S. Application Data

[60] Continuation of Ser. No. 672,391, Nov. 16, 1984, abandoned, which is a division of Ser. No. 401,083, Jul. 23, 1982, abandoned.

[51] Int. Cl.$^4$ .............................................. F16L 37/28
[52] U.S. Cl. ............................. 141/311 R; 137/234.6; 285/2
[58] Field of Search .................... 137/234.6, 356; 141/311 R, 382, 389, 1; 285/2; 339/45 R, 80

[56] References Cited

U.S. PATENT DOCUMENTS

| | | | |
|---|---|---|---|
| 584,144 | 6/1897 | Gold | 251/149.9 |
| 2,048,388 | 7/1936 | Johnsen | 137/68 R |
| 2,135,221 | 11/1938 | Scheiwer | 251/149.1 |
| 2,452,430 | 10/1948 | Clark et al. | 285/276 X |
| 2,455,544 | 12/1948 | Yonkers | 285/276 X |
| 2,536,702 | 1/1951 | Scheiwer | 285/1 X |
| 2,599,935 | 6/1952 | Pasker | 285/276 X |
| 2,631,872 | 3/1953 | Wurmser | 285/277 |
| 2,860,893 | 11/1958 | Clark | 285/1 |
| 3,237,147 | 2/1966 | Elliott et al. | 339/91 B |
| 3,317,220 | 5/1967 | Bruning | 285/304 X |
| 3,334,860 | 8/1967 | Bolton | 251/149.1 |
| 3,509,515 | 4/1970 | Acord | 339/45 |
| 3,715,099 | 2/1973 | Shenduke | 251/149.1 |
| 3,883,042 | 5/1975 | Junker | 222/23 |
| 3,918,679 | 11/1975 | Silvana | 251/149.1 |
| 4,089,548 | 5/1978 | Gurley | 285/3 |
| 4,098,438 | 7/1978 | Taylor | 222/529 |
| 4,124,228 | 11/1978 | Morrison | 285/1 |
| 4,134,416 | 1/1979 | Lallement et al. | 137/38 |
| 4,252,161 | 2/1981 | Krupp | 141/279 |
| 4,392,513 | 7/1983 | Parrish | 285/1 X |

*Primary Examiner*—Stephen Marcus
*Assistant Examiner*—Mark Thronson
*Attorney, Agent, or Firm*—Polster, Polster and Lucchesi

[57] ABSTRACT

A tension actuated fuel (e.g. gasoline) delivery hose uncoupler is disclosed in which, upon a predetermined tension or pressure load being applied to the delivery pump hose, the coupling will automatically uncouple thus releasing one end of the hose which, for example, may remain inserted in the fuel tank of a vehicle driving away from the fuel dispensing pump, and the other portion of the hose which is permanently affixed to the pump. The coupler includes normally closed checkvalves which, upon uncoupling of the coupler, close thereby preventing spillage of fuel. Further, the coupler is adjustable so that it may be calibrated to uncouple at predetermined tension loads.

3 Claims, 6 Drawing Figures

TENSION ACTUATED UNCOUPLER

This is a continuation of copending application Ser. No. 672,391 filed Nov. 16, 1984, now abandoned, which is a divisional of prior application Ser. No. 401,083 filed July 23, 1982, now abandoned.

BACKGROUND OF THE INVENTION

This invention relates primarily to a tension actuated coupler for a fuel (e.g. gasoline) pump delivery hose which will permit one portion of the hose to be uncoupled upon a tension load of predetermined magnitude being applied to the hose thereby to prevent damage to a fuel delivery pump or station. Alternatively, the tension actuated uncoupler of this invention may be incorporated in the lines supplying the fuel delivery station or pump such that if the pump is run into by a vehicle forceably tearing the pump from its moorings, the supply lines will automatically uncouple and seal. More specifically, this invention relates to such a coupler in which the hose portions, when uncoupled, are sealed so as to prevent the spillage of gasoline or other liquid fuel. Still further, this uncoupler is adjustable so that it may be calibrated (preferably at the factory) to accurately uncouple at predetermined load levels such that the hose is not uncoupled at unduly low loads, but yet which will be reliably uncoupled at predetermined tension loads so as to positively prevent damage to the fuel delivery pump.

In recent years, the advent of self service gasoline retail establishments has become a major, if not the predominant, manner in which gasoline and other petroleum fuels are sold at retail. Because customers utilizing self service gasoline pumps are not experienced gasoline service station attendants, and because they do this only occasionally and may be unfamiliar with the gasoline pump, its operation, and the gasoline service station's procedures for dispensing the gasoline and for payment, oftentimes a customer will dispense a quantity of gasoline into his vehicle's tank, pay for the gasoline, re-enter his car and begin to drive away from the service station pump island before he realizes that he has not removed the gasoline pump dispensing nozzle from the filler neck of his fuel tank. In many instances, the nozzle will pull out of the filler neck of the gasoline tank and fall harmlessly to the ground. However, in certain other instances, it is possible to exert exceedingly high tension loads on the fuel delivery hose leading from the delivery pump to the nozzle. More specifically, as an automobile drives off, it is possible to exert such a high force on the delivery hose that either the hose is ripped or torn from the pump, or that the delivery pump is torn free of its moorings to the service station pump island. In either instance, the potential exists for a significant spillage of volatile liquid fuel. Because of the close proximity of electrical power within the gas pump for lighting and the like and because these electrical wires may be ripped from the pump as the pump is pulled from its moorings, electrical sparks oftentimes will ignite any spilled fuel. Of course, with the close proximity of other vehicles and patrons within the service station, the potential exists for personal injury to several such persons in the event such a pump is pulled from its moorings and considerable physical damage may result to the service station such that it would be closed for a considerable length of time for repairs thus representing a significant economic loss to the operators.

This problem has been recognized in the past. Certain safety code requirements require that the spout for the dispensing nozzle be of breakaway construction such that at moderate loads, the spout will pull clear of the nozzle thus preventing excessive loads from being applied to the pump. However, in actual practice, the fact that pumps are regularly pulled clear of their moorings would indicate that the concept of the breakaway nozzle does not, in all cases, adequately protect against such accidents. Additionally, reference may be made to U.S. Pat. Nos. such as 584,144, 2,048,388, 3,883,042 and 4,098,438 which are in the same general field as the present invention.

For many years, dispensing pumps in gasoline stations and the like have been prone to being knocked over by vehicles in instances where the vehicle is errantly driven or is involved in an accident. Typically, dispensing pumps are moored to the service station pump island by means of bolts or the like and delivery pipes for the fuel from underground storage tanks are coupled to piping within the dispensing pump. Oftentimes, in the event of a collision, the dispensing pump will be ripped free of its moorings and the supply lines to the pump will be ruptured. Fuel (e.g., gasoline) is typically delivered to the dispensing station or pump from underground storage tanks by a submersible pump. In the event the dispensing pump is ripped free of its moorings and in the event the submersible pump is in operation, it will be appreciated that considerable quantities of volatile fuel may be expelled from the broken supply lines. In an effort to limit the amount of fuel that can be discharged upon a pump being ripped free of its moorings, certain pilot actuated diaphragm valves and other safety devices have been developed which block the flow of fuel upon the pump being ripped from its moorings. One such pilot actuated diaphragm valve is shown in U.S. Pat. No. 4,284,212. However, these various safety means for blocking the flow of fuel from the ruptured supply lines are complex and add considerably to the cost of installing the delivery pump.

In addition, automatic quick coupling kits are available for use on hydraulic systems for farm implements and the like which are connected to a tractor and which are powered by the hydraulic system on the tractor such that if the implement becomes inadvertently uncoupled from the tractor, the hydraulic fittings will automatically and instantaneously break away. Such fittings are commercially available from the Pioneer Quick Coupling Division of Parker Corporation, Minneapolis, Minnesota. However, these so-called breakaway hydraulic hose couplings require brackets to hold the female coupling and these breakaway couplings have no means for adjusting the force at which the couplings will break away or pull apart. Because of this inability to adjust the breakaway force and because of the wide variety of fuel delivery pumps, a single breakaway tension force would not be acceptable.

SUMMARY OF THE INVENTION

Among the several objects and features of this invention will be noted the provision of a tension actuated uncoupling fitting which may be readily installed on existing service station fuel delivery pumps and which may be adjusted for a particular pump so as to have an uncoupling force which insures that the fitting uncouples at a predetermined tension load level so as to prevent damage to the delivery pump on which it is installed;

The provision of such a tension actuated coupling device which will reliably operate after extended periods of service and under a variety of adverse weather conditions;

The provision of such a tension actuated uncoupling device which may be readily retrofitted to existing fuel delivery pumps without substantial modofication to the pump and which permits the ready replacement of pump delivery hoses;

The provision of such a tension actuated uncoupling device which when uncoupled, instantaneously blocks both the portion of the hose remaining attached to the delivery pump and the portion of the hose attached to the nozzle so as to prevent the spillage of any substantial amount of fuel;

The provision of such a tension actuated uncoupling device which is protected by a suitable abrasion and impact resistant covering so as to prevent damage to automobiles being serviced and so as to protect the coupling fitting;

The provision of such a tension actuated uncoupling device which may also be installed between the fuel lines within the delivery pump and the underground fuel delivery line leading from underground supply tanks to the pump island so that in the event a vehicle collides with a delivery pump and rips it free of its moorings to the pump island, the flow of fuel from both the pump and the delivery lines will be instantaneously blocked;

The provision of such a tension actuated uncoupling fitting which is of lightweight and yet rugged construction, which operates reliably, and which is economical to manufacture and to use; and The provision of such an uncoupling device which when it is inadvertantly uncoupled, such as by the driving away of an vehicle with the fuel delivery nozzle remaining inserted in the filler neck of the vehicle such as to cause an uncoupling action of the uncoupler, the hose sections may be readily coupled together such that the undamaged pump may be quickly put into service by the service station operator.

Other objects and features of this invention will be part apparent and in part pointed out hereinafter.

Briefly stated, a tension actuated uncoupling device of this invention is intended for use in a fuel dispensing system, such as in a service station or the like, having a pump for delivering liquid fuel (e.g., gasoline) via a supply line from a reservoir (such as an underground tank) to a fuel dispensing station. This fuel dispensing station (oftentimes referred to as a fuel delivery pump) has a flexible delivery line or hose with a nozzle at its free end for controlling the delivery of fuel into the fuel tank of a vehicle. More specifically, the improvement of this invention comprises means installed in a line (i.e., in either the supply line or the delivery hose) for uncoupling at least a portion of the line from another portion of the line and for substantially instantaneously blocking the flow of fuel from both portions of the line upon the uncoupling thereof in the event a tension load is applied to the line upon, for example, the vehicle driving away from the pump with the nozzle remaining inserted in the vehicle's fuel tank or upon a vehicle colliding with the dispensing station. More specifically, the uncoupling means comprises a female quick disconnect fitting secured to one of the line portions and a male quick disconnect fitting secured to the other of the line portions with the male fitting being sealably received within the female fitting thereby to permit the flow of fuel through the line. The coupler further includes releasable locking means for securing the male fitting within the female fitting, this locking means comprising a plurality of detent balls or other locking members spaced from one another around the female member and being movable radially inwardly and outwardly. A circumferential groove is provided in the male member in register with the balls when the male and female members are sealably secured together. Further, means is provided on the exterior of the female fitting engageable with the balls for resiliently biasing the balls inwardly toward a locking position in which they are at least in part received in the groove on the male fitting thereby to prevent the male and female fittings from being uncoupled, but yet, upon a tension load in excess of a predetermined value being applied to the line portions, the groove on the male member exerts a camming action on the balls forcing the balls radially outwardly thereby to permit the uncoupling of the line portions at the predetermined tension load.

BRIEF DESCRIPTION OF THE DRAWINGS

Corresponding reference characters indicate corresponding parts throughout the several views of the drawings.

DESCRIPTION OF PREFERRED EMBODIMENTS

Figure 5:
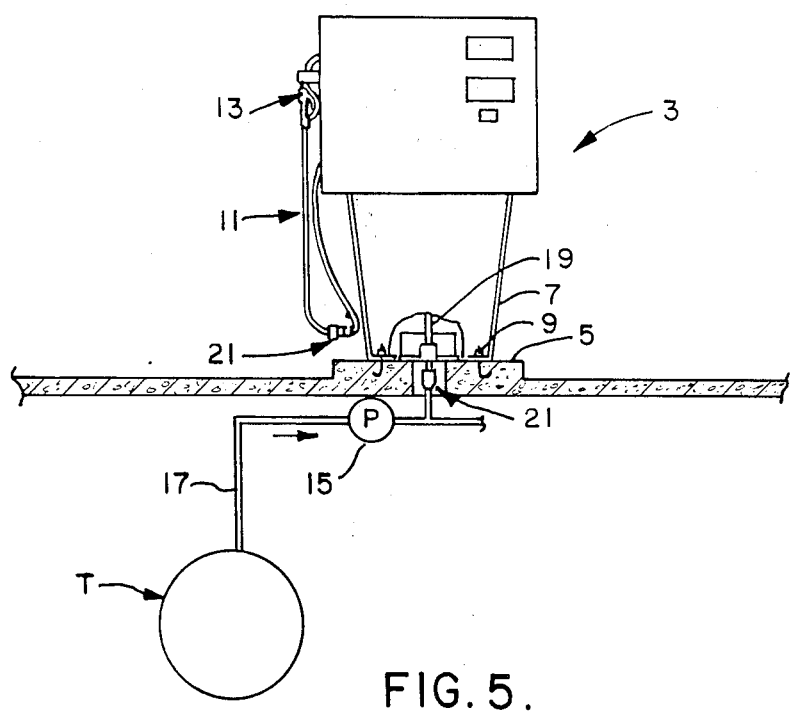
FIG. 5 is a front elevational view of a dispensing station or pump secured to a pump island or other foundation and a fuel delivery line leading from an underground fuel supply tank to the dispensing station with a coupling device coupling fuel lines within the dispensing station to the fuel delivery line.

Referring now to the drawings, a fuel dispensing system (i.e., a service station) is indicated in its entirety by reference character 1. As is typical, the service station includes a number of fuel dispensing stations 3, which are normally referred to as pumps. However, these so-called fuel pumps oftentimes do not contain a pump therein, but rather are merely a metering and control station. In this disclosure, however, the term gasoline pump will be utilized to refer to the dispensing station 3. As is typical, the gasoline pumps in a service station are mounted on a pump island or foundation 5 located on the driveway of the service station. Each of the gasoline pumps 3 includes a cabinet 7 which is anchored to the pump island by bolts 9 (see FIG. 5).

As is conventional, gasoline pump 3 includes a fuel dispensing line or hose, as generally indicated at 11, having a manually operated fuel dispensing nozzle 13 on the free end of hose 11 which is selectively manually operable by a person dispensing fuel thereby to control operation of pump 3. Nozzle 13 includes a spout (not shown) which is inserted into the filler neck of the fuel tank of an automobile A (or other vehicle) for tbe delivery of fuel into the fuel tank of the automobile. Fuel is delivered to pump 3 by means of a submersible pump 15 (see FIG. 5) via an underground fuel delivery line 17 from a tank T. Oftentimes, pump 15 will supply fuel to a plurality of gasoline pumps 3. Pump 3 further includes fuel lines 19 within the pump for providing communication between fuel delivery line 17 and fuel dispensing hose 11.

In accordance with this invention, a tension actuated coupler, as generally indicated at 21, is provided within fuel dispensing hose 11 for permitting the flow of fuel therethrough when coupled and for uncoupling at least one portion 23 of fuel dispensing hose 11 (i.e., the outer portion including nozzle 13) from the other portion 25 of the hose upon the application of a tension load to the hose of a predetermined value thereby to prevent or minimize damage to gasoline dispensing pump 3. Additionally, upon uncoupling of the hose, coupler 21 substantially instantaneously blocks the flow of fuel from both portions 23 and 25 of the hose thereby to prevent any substantial spillage of fuel and thereby to minimize fire hazards.

More particularly, fuel dispensing hose 11, intermediate its ends, has a swaged female fitting 27 sealably secured to the first hose portion 23 extending from the upper end of pump 3. A female coupling fitting, as generally indicated at 29, is sealably threaded into the swaged female fitting 27. The other half of coupler 21 is constituted by male fitting, as indicated at 31, which is sealably received within female fitting 29 when male and female fittings are sealingly coupled together. A threaded nipple 33 extends from the end of the male fitting 31 and is received in a swaged female fitting 35, similar to swaged female fitting 27, with this last-said swaged fitting sealably secured to the second portion 25 of fuel dispensing hose 11.

More specifically, female fitting 29 is constituted by a female body 37 having a flow passage 39 therethrough with a counterbore 41 in its inner end for receiving the outer portion of male fitting 31. As indicated at 43, female body 37 has a plurality of openings 43 therein extending circumferentially around the female body with each of these openings receiving a respective locking member or detent ball 45. Balls 45 are movable relative to female body 37 radially inwardly and outwardly with respect to female body 37 for purposes as will appear.

Figure 4:
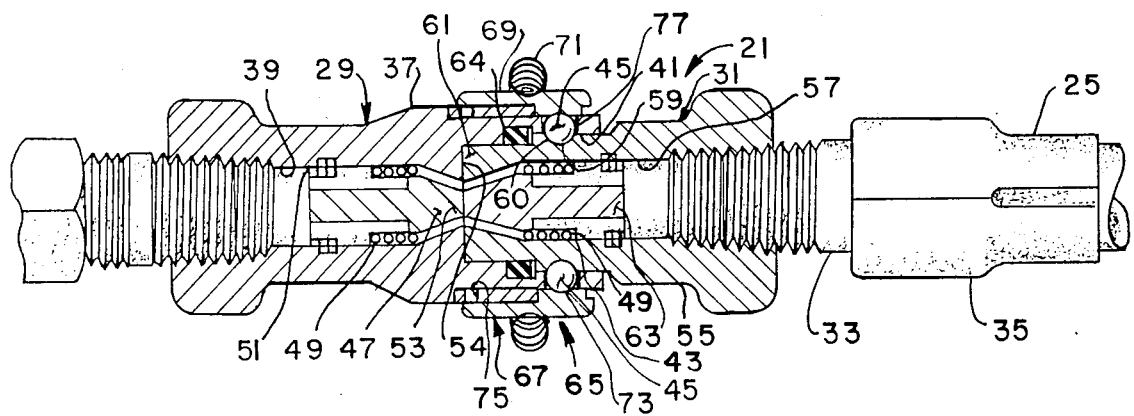
FIG. 4 is a longitudinal cross sectional view of at least a portion of the coupling device of the present invention illustrating means for sealably locking the male quick disconnect member within the female quick disconnect member and further illustrating means for adjustably varying the magnitude of the tension force required to be applied to the hose sections thereby to permit uncoupling of the hose sections.

Female body 37 further includes a check valve member 47 movable between a closed position (not shown) in which the flow of fuel through central bore 39 is blocked and an open position (as shown in FIG. 4) in which fuel may readily flow through coupler 21 from gasoline pump 3 to nozzle 13. A check valve spring 49 biases check valve member 47 to its closed position. Within central bore 39 of female body 37 a snap ring stop 51 is provided so as to serve as an abutment for check valve spring 49. A check valve seat 53 is formed within central bore 39 and is engagable with check valve member 47 when the latter is in its closed position to block the flow of fuel as described above. The outwardly facing shoulder, as indicated at 54, of seat 43 constitutes a limiting abutment within counterbore 41 adapted to engage the outer end of male fitting 31 and to prevent inward movement of the male fitting relative to female fitting 29 beyond a predetermined axial distance (i.e., the location of shoulder 54).

Figure 3:
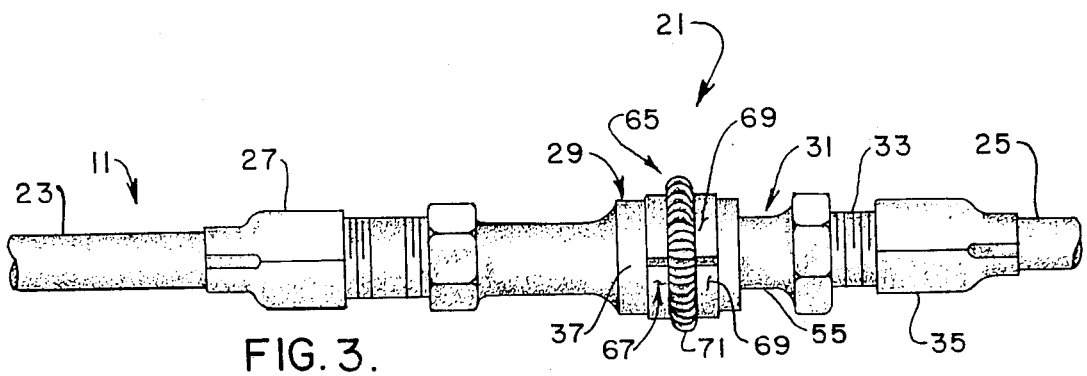
FIG. 3 is an enlarged side elevational view of the coupling device of the present invention illustrating a female quick disconnect member resealably receiving a male disconnect member.

Male fitting 31 is constituted by a male fitting body 55 having a central bore 57 extending axially therethrough, the central bore 57 of male fitting body 55 being generally coaxial with central bore 39 of female body 37 when the male fitting is coupled to the female fitting as shown in FIGS. 3 and 4. As indicated at 59, a circumferential detent groove is provided around the outer end of male fitting body 55 generally in register with detent ball openings 43 in female body 37 when the male and female fittings 29 and 31 are sealably coupled together whereby detent balls 45 may move radially inwardly into register with circumferential groove 59 thereby positively preventing withdrawal of the male fitting from its coupled position within female fitting 29. As best shown in FIG. 4, circumferential groove 59 has beveled sidewalls 60 which constitute cam faces engageable with the detent balls 43 for cammingly forcing the detent balls radially outwardly upon applying a longitudinal or axial tension load to hose portions 23 and 25. It will be appreciated that if this radially outwardly camming action of beveled cam faces 60 of circumferential groove 59 are of sufficient magnitude so as to forceably move balls 45 out of the circumferential groove, female and male fittings 29 and 31 will become uncoupled and are free to move axially away from one another.

Male fitting 31 has an outer end 61 engageable with shoulder 54 in counterbore 41 of female body 37 when the male and female fittings 29 and 31 are sealably coupled together as shown in FIGS. 3 and 4. Further, male fitting 31 includes a normally closed check valve 63 substantially identical in construction with check valve 47 heretofore described. It will be noted that both check valve 47 and check valve 63 have portions thereof which extend out beyond shoulder 54 of female fitting 29 and which extend out beyond the outer end 61 of male fitting 31 when the male and female fittings are uncoupled and when the check valves are in their closed positions. Upon inserting male fitting 31 into counterbore 41 of female fitting 29 and upon forcing the fittings into coupling engagement such that detent balls 45 come into register with circumferential groove 59, the protruding ends of check valve members 47 and 63 engage one another and force the check valves from their closed positions to their open positions against the bias of their respective check valve springs. In this manner, the check valves of the male and female fittings are automatically opened upon coupling of coupler 21 and, of course, upon uncoupling of the coupler, the check valves will automatically close thus blocking the flow of fuel therefrom. In addition, counterbore 41 includes a seal 64 engageable with the outer end of male fitting body 55 as the latter is inserted into the counterbore thereby to positively prevent leakage of fuel from the coupler.

In accordance with this invention, coupler 21 includes means 65 engageable with detent balls 45 for biasing the detent balls radially inwardly relative to female fitting body 37 and for permitting radial inward and outward movement of the balls relative to the female fitting body. More specifically, this biasing means 65 is shown to comprise a split collar, as indicated generally at 67, having a plurality of collar members 69 movable independently of one another and engageable with the outer surfaces of respective detent balls 45. Further, means 65 is shown to comprise a circumferential spring 71 engageable with the outer face of split collar 67 for resiliently biasing collar members 69 and the detent balls 45 engageable therewith radially inwardly relative to female fitting body 37 thereby to maintain the detent balls in engagement with the base of circumferential groove 59 in male fitting body 55 and thereby to positively maintain male fitting 31 in coupled relation with female fitting 29. It will be appreciated that as detent balls 45 are caused to move radially outwardly relative to female body fitting 37, such as by an outward camming force applied to the detent balls by beveled cam faces 60 of circumferential groove 59 upon the application of an axial tension load to the male and female fittings, circumferential spring 71 will stretch or increase in length thereby permitting collar members 69 and balls 45 to move radially outwardly.

As best shown in FIG. 4, each collar member 69 extends around a portion of the outer surface of female fitting body 37 and has a first contact point 73 engageable with the outer surface of its respective detent balls 45 and a second contact point 75 engageable with the outer surface of female fitting body 37, the first and second contact points being spaced axially from one another. Additionally, collar members 67 have another contact point intermediate the first contact point 73 and the second contact point 75, this intermediate contact point being constituted by a circumferential groove 77 formed in the outer faces of the collar members thereby to constitute a retaining groove for circumferential spring 71. It will be understood that, during fabrication of collar members 69, the location of intermediate groove 77 relative to the first contact point 73 (i.e., relative to the point of contact of the split collar members on the outer surfaces of its respective detent balls 45) determines the amount of inward biasing force of the circumferential spring 71 on the detent balls. More specifically, if the location of intermediate groove 77 is located directly over the point of contact of the split collar members 69 on the detent balls, the maximum inward biasing force is exerted on the detent balls. However, as the location of intermediate groove 77 moves axially away from the balls toward the location of the second contact point 75, the inward biasing force exerted on the balls proportionately decreases.

Further, in accordance with this invention, coupler 21 is provided with adjustable means for varying the axial tension load applied to fittings 29 and 31 required to permit uncoupling of the male and female fittings such that the coupler will break apart upon the application of a predetermined axial tension load thereto. In the coupler described above, it will be appreciated that by exchanging one circumferential spring 71 having a first spring constant for another circumferential spring having a higher or lower spring constant, the inwardly biasing forces exerted on the detent balls may be selectively varied. Further, by shifting the location of the circumferential groove 77 on the outer surfaces of collar members 69 toward and away from the first contact point 73 (i.e., toward or away from the point of contact of the collar members on the detent balls), the inwardly resilient biasing force of the spring 71 on the detent balls may be varied. Also, by changing the angle of beveled cam surfaces 60 of circumferential groove 59 on male fitting body 55, the outward camming force exerted on the balls by an axial tension load on the fittings 29 and 31 required for uncoupling thereof may be varied.

Still further in accordance with this invention, it will be understood that that circumferential spring 71 may be mounted on an adjustable screw-type mounting fixture (not shown), similar to a conventional hose clamp, such that the inward biasing force of the spring may be readily varied by adjusting the screw clamping arrangement thereby to increase or decrease the length of the spring. However, it is believed that it be preferable that the adjustment of the predetermined break away tension force for coupler 21 should only be done "at the factory" such that field service personnel and service station attendants will not be tempted to change the tension loading on spring 71 as this could cause uncoupling of coupler 21 at abnormally low or high tension forces.

Figure 1:
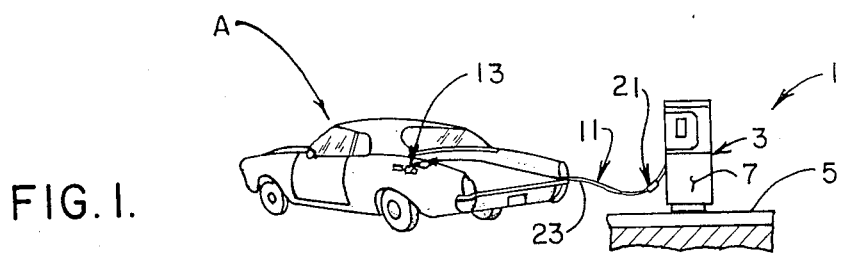
FIG. 1 is a perspective view of an automobile in a service station having liquid fuel (gasoline) dispensed into the fuel tank of the automobile via a conventional fuel dispensing station or pump with a tension actuated uncoupling device of the present invention installed in the fuel delivery hose between the pump and the dispensing nozzle on the free end of the hose.
Figure 2:
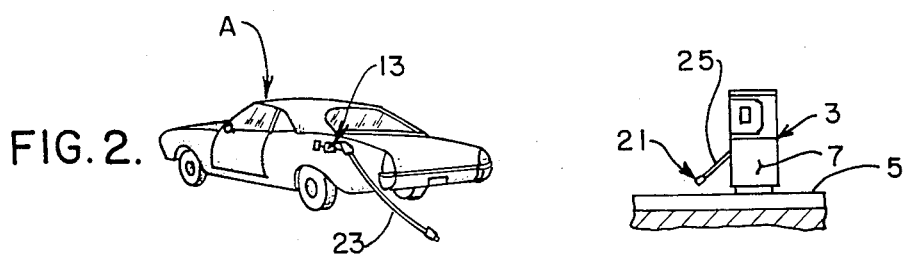
FIG. 2 is a view similar to FIG. 1 in which the automobile has driven away from the pump island with the delivery hose remaining in the fuel inlet to the automobile's gasoline tank and in which the uncoupling device of this invention has been actuated by the application of a tension load of predetermined value on the hose permitting uncoupling of the hose portions without substantial spillage of fuel and without damage to the delivery pump.

The force at which coupler 21 will reliably uncouple is a matter to be determined, depending upon the particular application of coupler 21. For example, if coupler 21 is installed in gasoline dispensing hose 11 and if the gasoline pump 3 is of a known design or model, then it can be determined what magnitude of tension load can be safely transmitted by the pump from hose 11 to the mounting of gasoline pump 3 on its foundation or pump island 5 without damage to nozzle 13, to gasoline dispensing hose 11 and without damage to the gasoline pump. Preferably, the predetermined axial tension load at which coupler 21 will reliably uncouple is selected such that the uncoupling force is, at all times during normal operation of gasoline pump 3, above the normal tension loadings usually imposed on the gasoline delivery hose by normal operations. However, in the event, for example, fuel dispensing nozzle 13 remains inserted in the filling neck of the fuel tank of an automobile A or other vehicle (as shown in FIGS. 1 and 2) and in the event the driver of the vehicle drives the vehicle away from the pump island thus placing an abnormally high axial tension load on the gasoline delivery hose 11, coupler 21 will uncouple thus preventing the application of excessive loads on nozzle 13, on fuel delivery hose 11 and on gasoline pump 3 so as to minimize or prevent damage thereto. Further, upon uncoupling of the male and female fittings, the check valves 47 and 63 thereof will automatically close thus preventing the spillage of any substantial amount of fuel and thus substantially reducing any potential fire hazard.

Further in accordance with this invention, coupler 21 may be utilized to connect the fuel delivery lines 19 within cabinet 7 of gasoline pump 3 to the underground fuel delivery lines 17 supplying fuel to gasoline pump 3 from submersible pump 15. Thus, in the event a substantial tipping force would be applied to the gasoline pump, either caused by an automobile pulling away from the pump island with nozzle 13 remaining inserted in the filler neck of the vehicle's gasoline tank or caused by a collision between the vehicle and the gasoline pump, the pump will pull free of the fuel supply lines 17 and coupler 21 will prevent any substantial spillage of fuel. It will be appreciated with pump 15 supplying volatile fuel to a plurality of gasoline pumps 13, in instances where gasoline pump 13 is torn from its mounting on pump island 5, pump 15 could continue to deliver substantial quantities of the volatile fuel via the fuel delivery line 15 and thus could create a substantial risk of fire or explosion.

Further, it will be appreciated that with coupler 21 installed on fuel dispensing hose 11, the coupler may be utilized to permit the ready exchange of one fuel delivery hose and nozzle assembly with another. Thus, servicing of the nozzles and of the dispensing hoses could be readily facilitated. Still further, it will be appreciated that the coupler 21 of the present invention incorporated in a new fuel dispensing hose and nozzle assembly can be readily retrofitted to existing gasoline delivery pumps 3 without substantial modification to the gasoline pumps. Thus, in a short time, all of the gasoline delivery pumps at a service station could readily be converted to include the couplers 21 of the present invention.

Also, those skilled in the art will recognize that fluid pressure within coupler 21 may exert an axial tension load on female fitting 27 and on male fitting 31 such that upon the fluid pressure within hose 11 exceeding a predetermined pressure level, coupler 21 will automatically uncouple.

Figure 6:
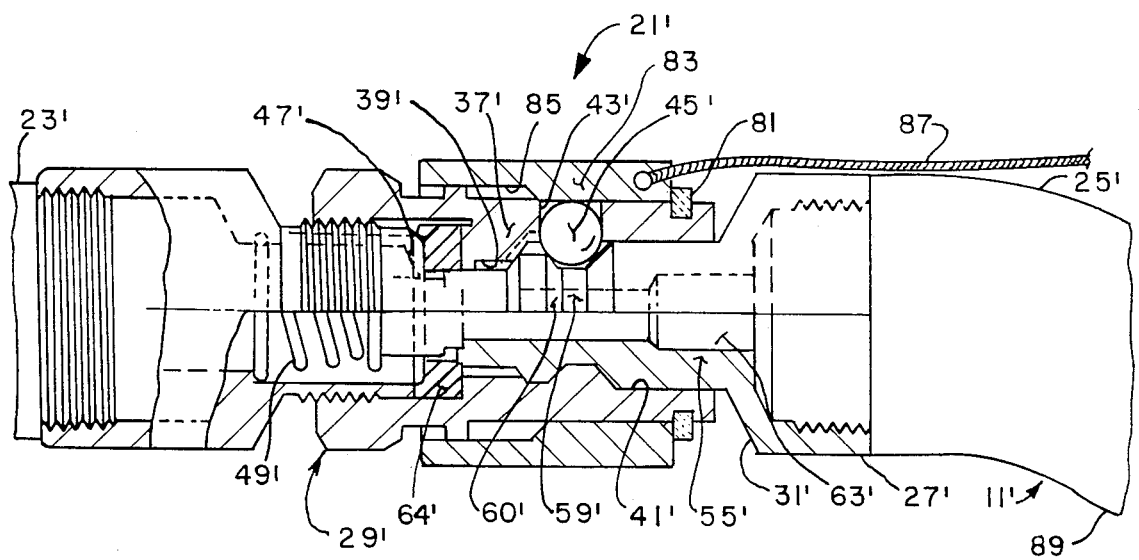
FIG. 6 is a cross-sectional view of another embodiment of the coupling device of the present invention.

Referring now to FIG. 6, another embodiment of the tension actuated coupler of the present invention is shown in detail, as it is installed on the fuel delivery hose 11. In the disclosure of the second embodiment of this tension actuated coupler, the coupler is indicated in its entirety by reference character 21'. It will be understood that corresponding parts for the second embodiment of the coupler having a similar construction and function as parts heretofore described in regard to coupler 21 will be indicated by "primed" reference numbers and thus the construction and operation of these components or parts of coupler 21' will not be described in detail for the sake of brevity.

The primary difference in construction and operation between coupler 21 and coupler 21' is the fact that while both of the couplers are tension actuated devices intended to uncouple hose portions 23 and 27 from one another upon the axial tension forces applied to delivery hose 11 or 11' exceeding a predetermined value, coupler 21 operated on the principle of a camming action being applied to the detent balls 45 by the cam surfaces 60 in circumferential groove 59 of the male fitting member with these camming forces forcing the detent balls radially outwardly and causing the split collar members 69 to move radially outwardly against the bias of circumferential spring 71. However, in the second embodiment of the coupler 21', a tension force exerted on the hose is reacted through a shear member, as generally indicated at 81, carried by female fitting body 37' such that the shear member will fail and shear at a predetermined axial tension load thereby permitting a collar 83 slidably mounted on the exterior of female body 37' to move axially from a retaining position (as shown in FIG. 6) in which the collar surrounds the detent balls 45' and positively prevents the detent balls from moving radially outwardly thus keeping the detent balls engaged with circumferential groove 59' and thus positively coupling the male and female fittings together to a retracted position (i.e., axially shifted to the right as shown in FIG. 6) and which an enlarged inner diameter portion 85 of collar 83 moves into register with the detent balls thus permitting the detent balls to move radially outwardly away from the male collar members and thus permitting uncoupling of the hose.

As best shown in FIG. 6, the tension force exerted on slidable collar 83 is exerted through a lanyard 87 securely fastened to the collar and to hose portion 25' with a kink or slack portion, as indicated at 89 provided, in hose portion 25' such that lanyard 87 transfers substantially all of the tension forces in the hose to slidable collar 83. It will be appreciated that shear member 81 may be made of a relatively easy shearable material, such as lead, brass, or the like whose shear forces may readily be determined such that the shear member 81 will fail reliably at a predetermined tension load. Further, once the shear member 81 has failed and once the collar has moved from its retaining to its released position thus permitting the uncoupling of the hose portions, it will be appreciated that lanyard 87 is so designed as to readily fail under tension forces before any permanent damage may be done to the fuel dispensing station 3 or to the hoses.

As described above in regard to coupler 21', upon the coupler 21 uncoupling, the check valves incorporated within the male and female fittings will instantaneously close thereby preventing the spillage of any substantial amount of fuel.

Additionally, those skilled in the art will recognize that the tension actuated coupler of this invention may also have suitable applications for use on the hydraulic systems of various implements, particularly farm implements, which permit uncoupling of hydraulic hoses from the implement to the tractor in the event the implement inadvertantly becomes unhitched from the tractor thereby to prevent damage to the hydraulic hoses and to prevent the loss of hydraulic fluid. Further, those skilled in the art will recognize that the uncoupler of this invention would have application in other fuel dispensing systems, such as liquefied propane and liquefied natural gas systems. Specifically, if such an uncoupler were used as the dispensing nozzle of a liquefied propane system for filling a vehicle tank, the hose would automatically pull clear of the tank filling coupling upon the automobile driving away from the fuel dispensing pump in the event the attendant or other person dispensing the fuel forgot to disconnect the dispensing hose prior to the vehicle driving away.

In view of the above, it will be seen that the other objects of this invention are achieved and other advantageous results obtained.

As various changes could be made in the above constructions without departing from the scope of the invention, it is intended that all matter contained in the above description or shown in the accompanying drawing shall be interpreted as illustrative and not in a limiting sense.

We claim:

1. In a fuel dispensing system including a fuel storage tank, a fuel dispensing station stationarily mounted on a foundation, a fuel supply line between said tank and said dispensing station, and a pump for delivering fuel via said fuel supply line from said tank to said dispensing station, the latter including a line therewithin connected to said fuel supply line and a flexible dispensing line having a free end and having a selectively operable nozzle on the free end for controlling delivery of fuel into the fuel tank of a vehicle or the like, wherein the improvement comprises: a tension actuated coupler installed in one of said lines for permitting the flow of fuel therethrough when coupled and for uncoupling at least a portion of said one line from another portion thereof in the event a tension load above a predetermined limit being applied to said one line thereby to minimize damage to said dispensing station, said coupler comprising a female quick disconnect fitting secured to one of said line portions and a male quick disconnect fitting secured to the other portion of said one line with the male fitting being sealably secured within said female fitting when said male and female fittings are coupled together thereby to permit the flow of fuel through said line, means carried by one of said fittings engagable with the other of said fittings for positively securing the fittings together in coupled relation, said securing means being carried by said female fitting and being engagable with a circumferential groove in said male fitting thereby to positively connect said male fitting in sealing engagement with said female fitting, said securing means being movable radially inwardly and outwardly relative to said female fitting between a locking position in which said male fitting is positively coupled to said female member and an unlocking position in which said male and female fittings are free of one another, a collar slidably movable on the exterior of the female fitting surrounding said securing means and being movable from a locking position in which said securing means are positively maintained in locking engagement with the male fitting and an axially shifted position in which the securing means are free to move radially outwardly to their unlocking position, and means interconnecting said collar with said hose portion for applying a force to said collar upon the application of a tension load to one of said hose portions above a predetermined value so as to move said collar from its locking to its unlocking position; further including a shear member engagable with said collar adapted to fail upon the application of a shear load thereto by said collar of a predetermined value, said means interconnecting said collar with said hose portion applying said shear load to said shear member.

2. In a fuel dispensing system including a fuel storage tank, a fuel dispensing station stationarily mounted on a foundation, a fuel supply line between said tank and said dispensing station, and a pump for delivering fuel via said fuel supply line from said tank to said dispensing station, the latter including a line therewithin connected to said fuel supply line and a flexible dispensing line having a free end and having a selectively operable nozzle on its free end for controlling the delivery of fuel into the fuel tank of a vehicle, wherein the improvement comprises: a tension actuated uncoupler installed in said flexible line for permitting the flow of fuel therethrough when coupled and for uncoupling at least a portion of said flexible line from another portion thereof in the event a tension load above a predetermined limit is applied to said flexible line thereby to minimize damage to said dispensing station, said uncoupler comprising a female fitting secured to one of said flexible line portions and a male fitting secured to the other portion of said flexible line, means carried by one of said fittings engageable with the other of said fittings when said male and female fittings are coupled together with the male fitting received within the female fitting for positively securing said fittings together in sealed, coupled relation and, upon the application of said tension load above said predetermined limit being applied to said flexible line, for shearing thereby to permit the uncoupling of said fittings from one another and to break said flexible line and to minimize damage to said dispensing station.

3. In a fuel dispensing system as set forth in claim 2 wherein each of said fitting includes normally closed valve means for blocking the flow of fuel through each of said respective fittings, said normally closed valve means in each of said fittings being positively held open when said fittings are sealably coupled to one another.

* * * * *